(12) United States Patent
Fang et al.

(10) Patent No.: US 8,035,402 B2
(45) Date of Patent: Oct. 11, 2011

(54) SENSOR

(75) Inventors: Yu-Jen Fang, Taichung (TW); Jen-Yi Chen, Hsinchu County (TW); Kai-Hsiang Yen, Taipei (TW); Po-Hsun Sung, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/017,052

(22) Filed: Jan. 31, 2011

(65) Prior Publication Data

US 2011/0121843 A1 May 26, 2011

Related U.S. Application Data

(62) Division of application No. 12/110,369, filed on Apr. 28, 2008, now Pat. No. 7,902,843.

(30) Foreign Application Priority Data

Nov. 5, 2007 (TW) .............................. 96141675 A

(51) Int. Cl.
*G01R 27/26* (2006.01)
*G01L 9/12* (2006.01)
(52) U.S. Cl. ............................ 324/686; 324/658; 73/718
(58) Field of Classification Search .................. 324/686, 324/658, 649, 600, 663, 662, 661, 660, 688, 324/689, 681, 678, 674, 671, 519, 76.11; 73/718, 780, 724, 514.3, 862.337, 862.626; 702/47, 52
See application file for complete search history.

(56) References Cited

U.S. PATENT DOCUMENTS

| | | | | | |
|---|---|---|---|---|---|
| 4,393,714 | A | * | 7/1983 | Schmidt | 73/718 |
| 4,703,658 | A | * | 11/1987 | Mrozack et al. | 73/724 |
| 4,730,496 | A | * | 3/1988 | Knecht et al. | 73/724 |
| 5,659,195 | A | * | 8/1997 | Kaiser et al. | 257/415 |
| 6,338,284 | B1 | * | 1/2002 | Najafi et al. | 73/866.1 |
| 6,591,689 | B2 | * | 7/2003 | Nidan et al. | 73/754 |
| 2008/0123242 | A1 | * | 5/2008 | Zhou | 361/290 |

FOREIGN PATENT DOCUMENTS

| | | |
|---|---|---|
| JP | 01316099 | 12/1989 |
| JP | 07077471 | 3/1995 |
| JP | 2004537182 | 12/2004 |
| JP | 2005295278 | 10/2005 |
| JP | 2007060285 | 3/2007 |
| JP | 2007150514 | 6/2007 |
| JP | 2007165597 | 6/2007 |

OTHER PUBLICATIONS

"Office Action of Japan Counterpart Application", issued on May 10, 2011, p. 1-p. 2, in which the listed references were cited.

* cited by examiner

*Primary Examiner* — Hoai-An D Nguyen
(74) *Attorney, Agent, or Firm* — Jianq Chyun IP Office

(57) ABSTRACT

A sensor including a carrier, a plurality of conductive bumps, a capacitive sensing element connected to the carrier through the conductive bumps, and a cover is provided. The capacitive sensing element has a membrane, and a channel is formed among the capacitive sensing element, the conductive bumps, and the carrier. The cover is disposed on the carrier for covering the capacitive sensing element. A chamber is formed between the capacitive sensing element and the cover. The chamber and the channel are respectively located at two sides of the membrane.

6 Claims, 7 Drawing Sheets

SENSOR

CROSS-REFERENCE TO RELATED APPLICATION

This application is a divisional of an application Ser. No. 12/110,369, filed on Apr. 28, 2008, which claims the priority benefit of Taiwan application serial no. 96141675, filed on Nov. 5, 2007. The entirety of each of the above-mentioned patent applications is hereby incorporated by reference herein and made a part of this specification.

BACKGROUND

1. Field of the Disclosure

The present disclosure relates to a sensor. More particularly, the present disclosure relates to a capacitive sensor.

2. Description of Related Art

Along with the progress of technology, a variety of sensors such as pressure sensors for sensing pressure, accelerometers, or acoustic sensors for sensing sound waves have been widely applied to electronic products. Taking the acoustic sensors for example, as the market has a demand for higher sound quality, the acoustic sensors are usually equipped with capacitive microphones of good signal quality.

FIG. 1 is a schematic view of a conventional acoustic sensor applied to a cell phone. Referring to FIG. 1, the acoustic sensor 100 uses a cover 110 to cover a micro-electro-mechanical system (MEMS) microphone 130 on a carrier 120. A rubber material 140 is filled in the cover 110, and an acoustic channel 150 in communication with the MEMS microphone 130 is reserved in the cover 110, such that sound waves are transmitted to the MEMS microphone 130 via the acoustic channel 150 so as to be converted into an electrical signal. It should be noted that since electronic products are developed to become lighter and thinner, the inner space is limited. The acoustic sensor 100 has an acoustic channel 150 therein, so the volume of the acoustic sensor 100 is too large to be disposed into an electronic product with a limited inner space.

Further, as shown in FIG. 2, US Patent Publication NO. U.S. Pat. No. 6,781,231 discloses a "MICRO-ELECTRO-MECHANICAL SYSTEM PACKAGE WITH ENVIRONMENTAL AND INTERFERENCE SHIELD." The package structure 200 includes an MEMS microphone 210, a carrier 220, and a metal cover 230. The carrier 220 is used for carrying the MEMS microphone 210. In addition, the metal cover 230 has at least one acoustic port 240 that allows sound waves to reach the MEMS microphone 210.

However, the fabrication of the package structure 200 has difficulties and limitations. In detail, it is difficult to fabricate the acoustic port 240 in the metal cover 230 since the metal cover 230 is very thin. On the other hand, if the acoustic port 240 is formed in a side surface of the metal cover 230, the size of the acoustic port 240 will be limited by the height of the metal cover 230, such that the height of the package structure 200 cannot be further reduced, which is against the purpose of a light and thin product.

Besides, during packaging, a machine is employed to adsorb the metal cover 230, so as to attach the metal cover 230 on the carrier 220 for covering the MEMS microphone 210 in the conventional art. If the acoustic port 240 is disposed at the top of the metal cover 230, when the machine adsorbs the metal cover 230, the adsorption range of the machine may cover the acoustic port 240, such that the adsorptive power generated by the machine may easily damage the membrane of the MEMS microphone 210, thus resulting in a poor product yield.

SUMMARY

The present disclosure is directed to a sensor, which meets the trend of light and thin, and has a preferred product yield.

The present disclosure is directed to a sensor, which achieves a directional sensing effect.

The present disclosure provides a sensor including a carrier having a first channel and a second channel, a capacitive sensing element disposed on the carrier, and a cover. The capacitive sensing element has a membrane, and a first chamber is formed between the membrane and the carrier. The cover is disposed on the carrier for covering the capacitive sensing element. A second chamber is formed between the membrane and the cover. The first chamber and the second chamber are respectively located at two sides of the membrane. The first channel is communicated with one of the first and second chambers, and the second channel is communicated with the other of the first and second chambers.

The present disclosure provides a sensor including a carrier, a plurality of conductive bumps, a capacitive sensing element, and a cover. The capacitive sensing element has a membrane. The capacitive sensing element is connected to the carrier through the conductive bumps. A channel is formed among the capacitive sensing element, the conductive bumps, and the carrier. The cover covers the capacitive sensing element, and a chamber is formed between the cover and the capacitive sensing element. The chamber and the channel are respectively located at two sides of the membrane.

In the present disclosure, the carrier is provided with a channel that allows external waves to be transmitted to the capacitive sensing element of the sensor via the channel. As the channel of the carrier will not influence the overall volume of the sensor, the sensor provided by the present disclosure is applicable to dispose in a light and thin electronic product. Moreover, compared with the conventional art that the metal cover is difficult to be processed, the channel in the present disclosure is easy to be formed in the carrier.

On the other hand, the capacitive sensing element is connected to the carrier via a plurality of conductive bumps, such that a channel is formed among the capacitive sensing element, the plurality of conductive bumps, and the carrier. External waves can also be transmitted to the capacitive sensing element of the sensor via the channel.

In order to make the aforementioned and other objectives, features, and advantages of the present disclosure comprehensible, embodiments accompanied with figures are described in detail below.

It is to be understood that both the foregoing general description and the following detailed description are exemplary, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

The present disclosure arranges a channel in the carrier for carrying a capacitive sensing element. The capacitive sensing element is, for example, a pressure sensor for sensing pressure, an accelerometer, or an electro-acoustic element for sensing sound waves. The external waves can be transmitted to the sensor via the channel, and then converted by the capacitive sensing element in the sensor into an electrical signal. Further, the capacitive sensing element is connected to the carrier via a plurality of conductive bumps, such that a channel is formed among the capacitive sensing element, the plurality of conductive bumps, and the carrier. External waves can also be transmitted to the sensor via the channel. On the other hand, the present disclosure may fabricate another channel in the carrier or a hole in the cover for covering the capacitive sensing element, so that the sensor becomes a directional sensor. The detail description of these implementations will be illustrated below in the present disclosure, and for the convenience of illustration, an acoustic sensor is taken as an example.

Figure 1:
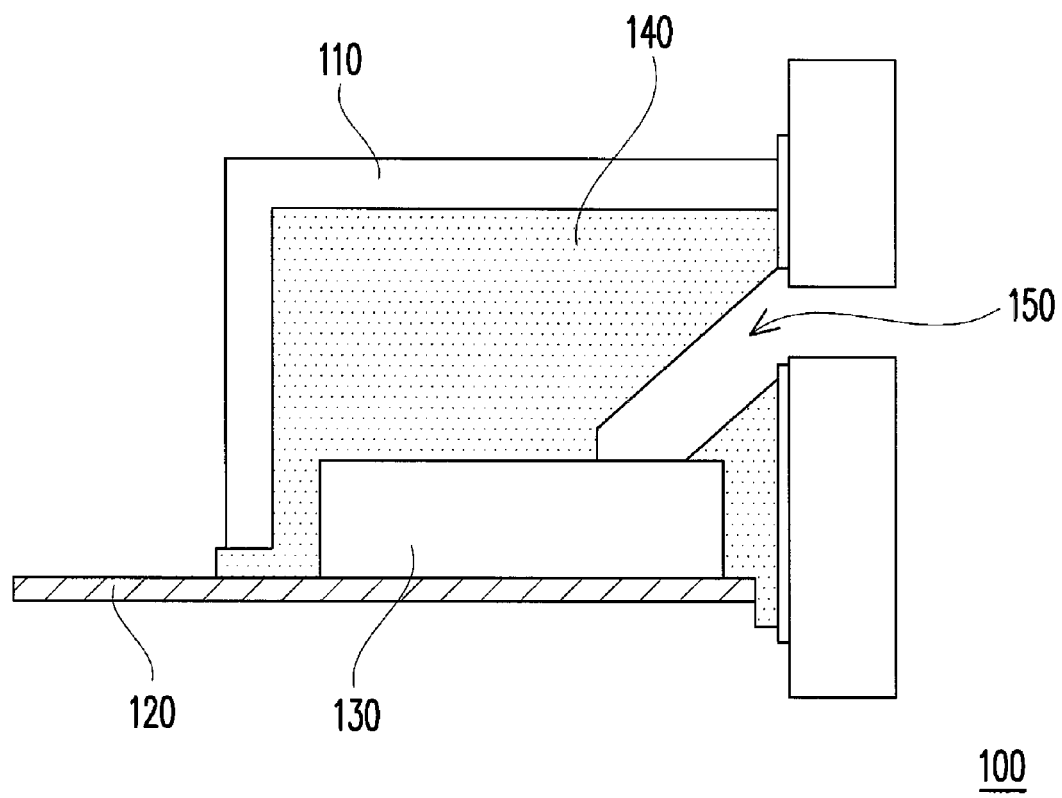
FIG. 1 is a schematic view of a conventional acoustic sensor applied to a cell phone.
Figure 2:
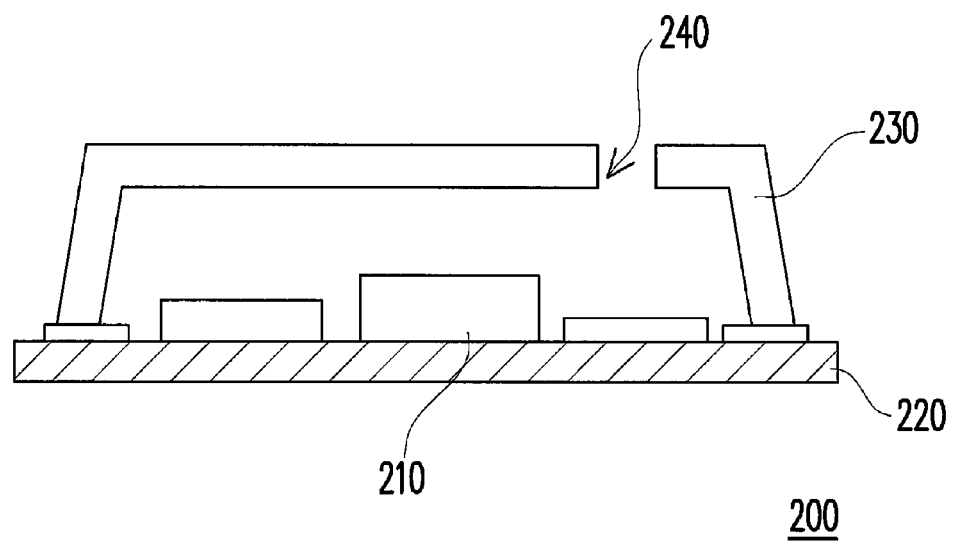
FIG. 2 is a schematic view of another conventional acoustic sensor.
Figure 3A:
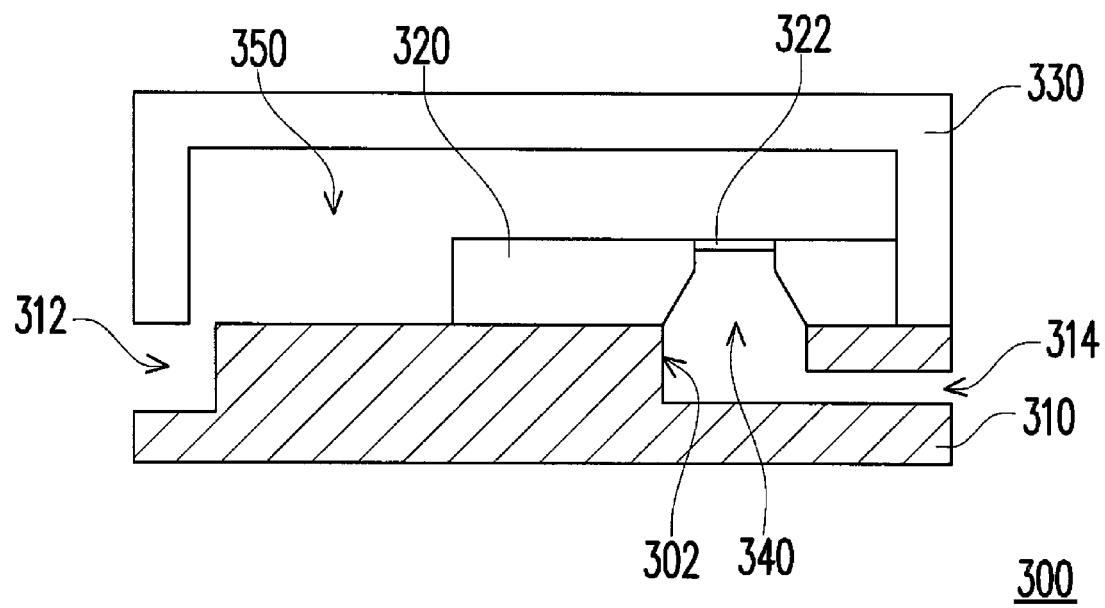
FIG. 3A is a cross-sectional view of a sensor according to an embodiment of the present disclosure.
Figure 3B:
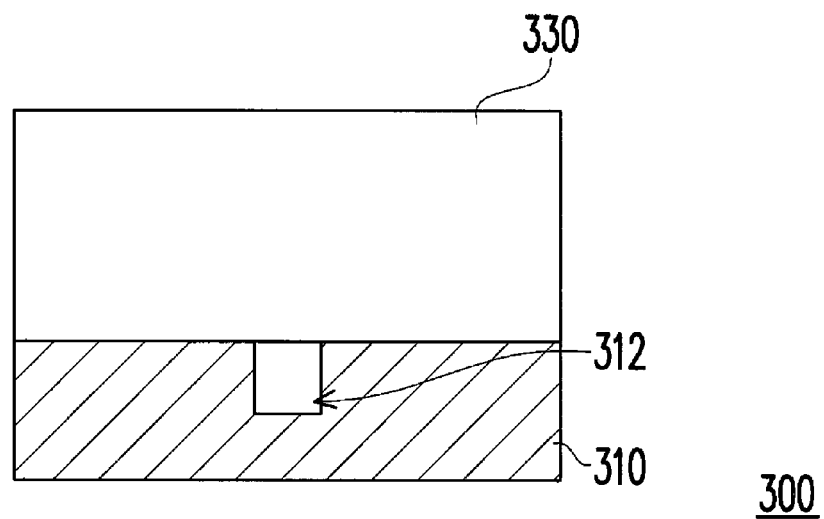
FIG. 3B is a side view of the sensor in FIG. 3A.

FIG. 3A is a cross-sectional view of a sensor according to an embodiment of the present disclosure, and FIG. 3B is a side view of the sensor in FIG. 3A. Referring to FIGS. 3A and 3B together, the sensor 300 of this embodiment includes a carrier 310, a capacitive sensing element 320 disposed on the carrier 310, and a cover 330. In this embodiment, the carrier 310 has a first channel 312 and a second channel 314. For example, the first channel 312 and the second channel 314 are formed by laser in the carrier 310 such as a printed circuit board (PCB) or a conductive plastic lamination layer. The capacitive sensing element 320 such as an electro-acoustic element has a membrane 322, and a first chamber 340 is formed between the membrane 322 and the carrier 310. Moreover, in this embodiment, a groove 302 is formed in the carrier 310, so as to make the first chamber 340 communicated with the groove 302. Further, the cover 330 is disposed on the carrier 310 for covering the capacitive sensing element 320, and a second chamber 350 is formed between the membrane 322 and the cover 330. The first chamber 340 and the second chamber 350 are respectively located at two sides of the membrane 322.

In this embodiment, the first channel 312 and the second channel 314 are respectively located at two sides of the capacitive sensing element 320. The first channel 312 is communicated with one of the first chamber 340 and the second chamber 350, and the second channel 314 is communicated with the other of the first chamber 340 and the second chamber 350 (the first channel 312 in FIG. 3A is communicated with the second chamber 350, and the second channel 314 is communicated with the first chamber 340; while in another embodiment, the first channel 312 is communicated with the first chamber 340, and the second channel 314 is communicated with the second chamber 350). As such, external sound waves can be transmitted to the second chamber 350 via the first channel 312, or transmitted to the first chamber 340 via the second channel 314, such that the membrane 322 of the capacitive sensing element 320 starts vibrating (the sensing circuit on the capacitive sensing element is not depicted in FIGS. 3A and 4, and a simple pattern is depicted for avoiding any limitation. The sensing circuit on the capacitive sensing element will be depicted clearly in FIGS. 5, 6, 7, and 8).

It should be noted that since the first channel 312 and the second channel 314 are respectively located at two sides of the capacitive sensing element 320, the capacitive sensing element 320 is capable of receiving sound waves from different directions. Particularly, in this embodiment, the channel length of the second channel 314 is, for example, greater than that of the first channel 312, so a time difference exists between the sound waves transmitted to the capacitive sensing element 320 via the first channel 312 and the second channel 314, and thus the sensor 300 determines the transmission directions of the sound waves. That is, the sensor 300 of this embodiment is a directional sensor.

In the present disclosure, in addition using different channel lengths of the first channel 312 and the second channel 314 to achieve a time difference between the sound waves transmitted to the capacitive sensing element 320, a mechanical screen (not shown) may be disposed in the first channel 312 or the second channel 314 in another embodiment, so as to form a time difference between the sound waves transmitted in the first channel 312 and the second channel 314 through, for example, the mechanical screen is composed of porous material.

Figure 3C:
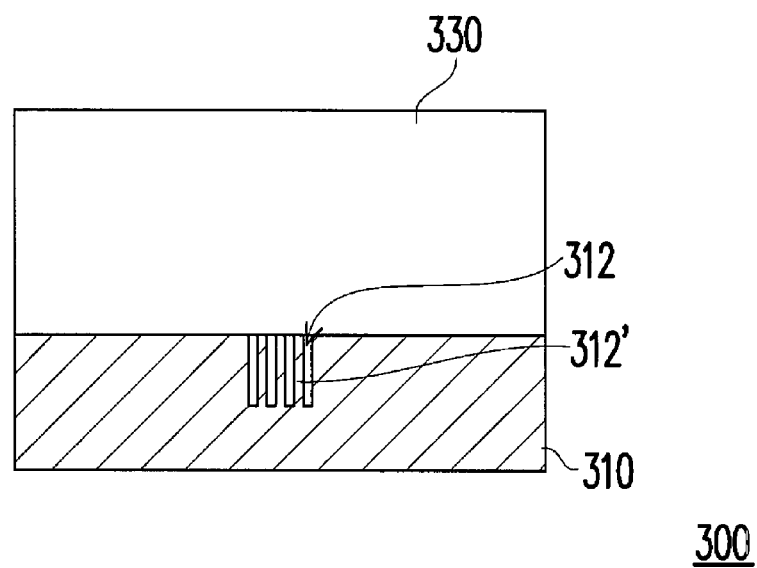
FIG. 3C is a schematic view of a channel opening with a porous structure.

Besides, in order to prevent dusts in the surrounding environment entering the sensor 300 via the first channel 312 to contaminate the capacitive sensing element 320, in this embodiment, a porous structure 312' is formed at the opening of the first channel 312, so as to effectively block the dusts in the environment. The porous structure 312' is, for example, a net structure or fence structure (referring to FIG. 3C, a schematic view of a channel opening with a porous structure is shown). Definitely, in this embodiment, another porous structure may be formed at the opening of the second channel 314, so as to effectively block the dusts in the environment.

Figure 4:
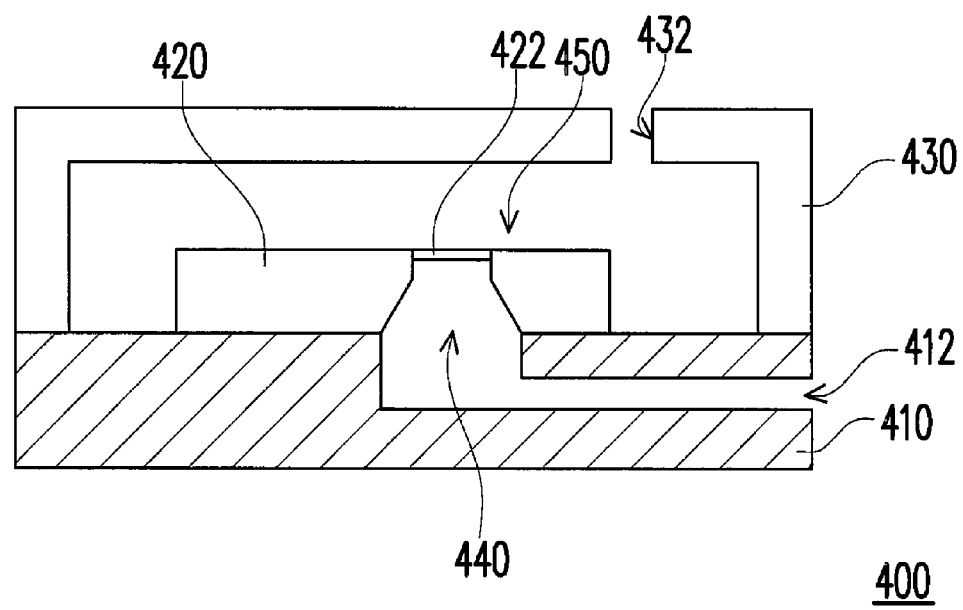
FIG. 4 is a cross-sectional view of a sensor according to an embodiment of the present disclosure.

Next, another directional sensor is described as follows. Referring to FIG. 4, a cross-sectional view of a sensor according to an embodiment of the present disclosure is shown. In this embodiment, for example, a carrier 410 has a first channel 412 in communication with a first chamber 440, and a cover 430 has a hole 432 in communication with a second chamber 450. Similar to the sensor 300 in FIG. 3A, in the sensor 400 of this embodiment, a membrane 422 of a capacitive sensing element 420 may also identify the directions of sound waves transmitted to the sensor 400 via the hole 432 and the first channel 412.

Figure 5:
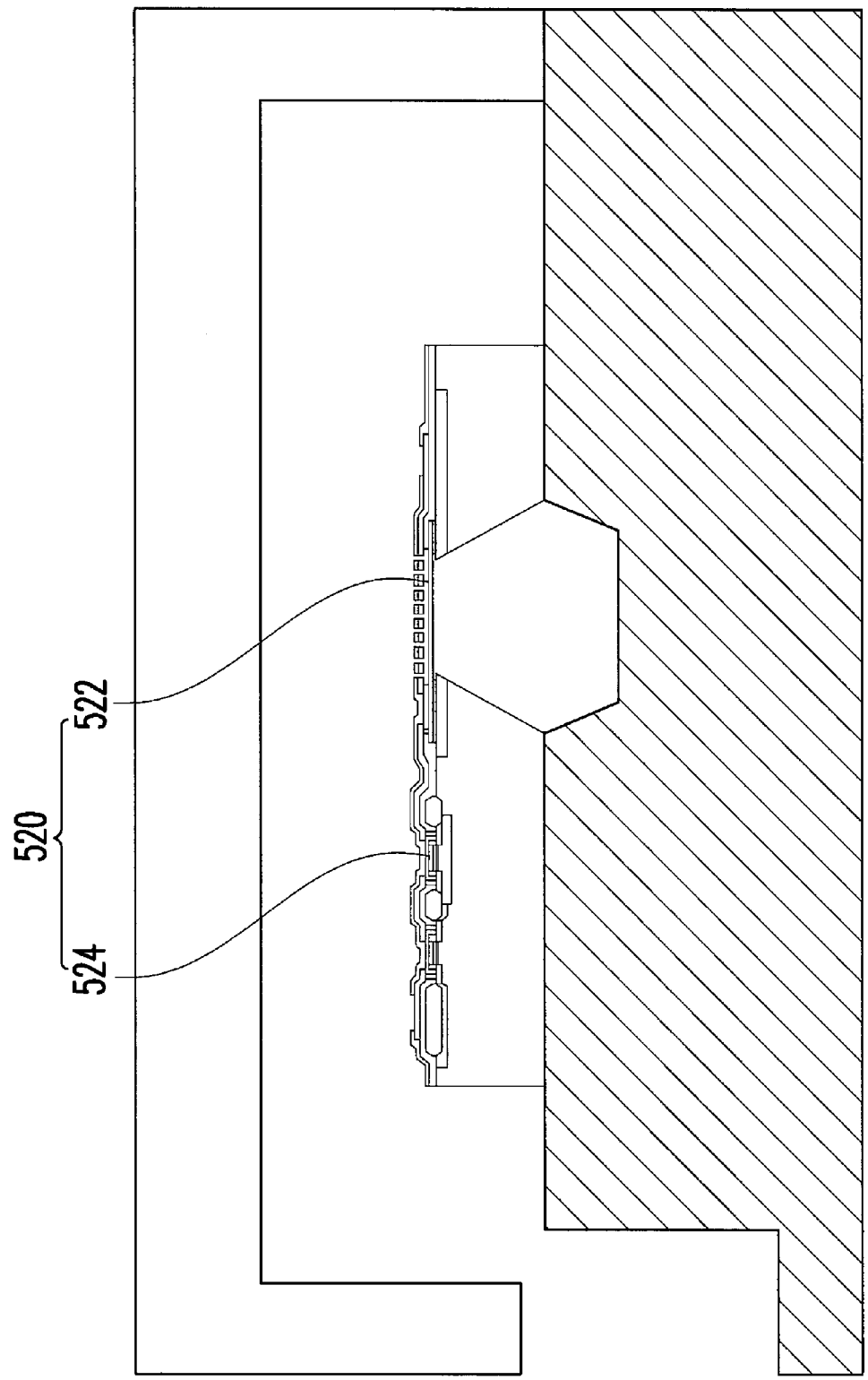
FIG. 5 is a cross-sectional view of a sensor according to an embodiment of the present disclosure.
Figure 6:
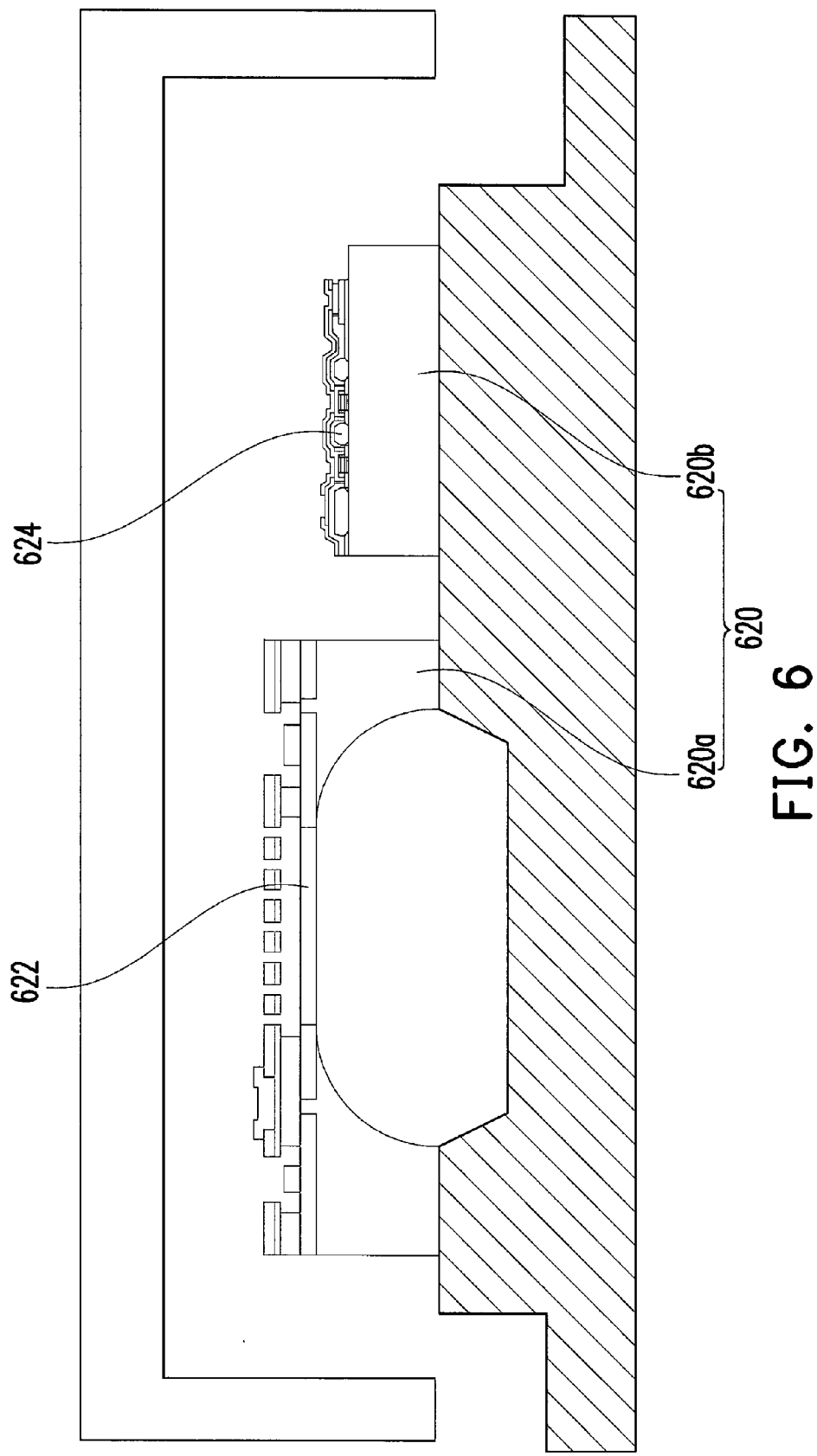
FIG. 6 is a cross-sectional view of a sensor according to an embodiment of the present disclosure.

In an embodiment, a capacitive sensing element 520 is a complementary metal-oxide semiconductor (CMOS) device (as shown in FIG. 5). The capacitive sensing element 520 has a sensing circuit 524 including a readout circuit, an amplifier circuit, and a pressurizing circuit. The sensor 500 may read a vibration parameter of a membrane 522 through the readout circuit. Further, in another embodiment, a capacitive sensing element 620 also includes an MEMS device 620a and a control chip 620b (as shown in FIG. 6) electrically connected to the MEMS device 620a. The control chip 620b also has a sensing circuit 624, such that a vibration parameter of a membrane 622 may be read through a readout circuit of the sensing circuit 624. In the present disclosure, each of the capacitive sensing elements 320, 420, 520 of the above embodiments may be a combination of a MEMS device 620a and a control chip 620b or a CMOS device, which is not limited herein.

Figure 7:
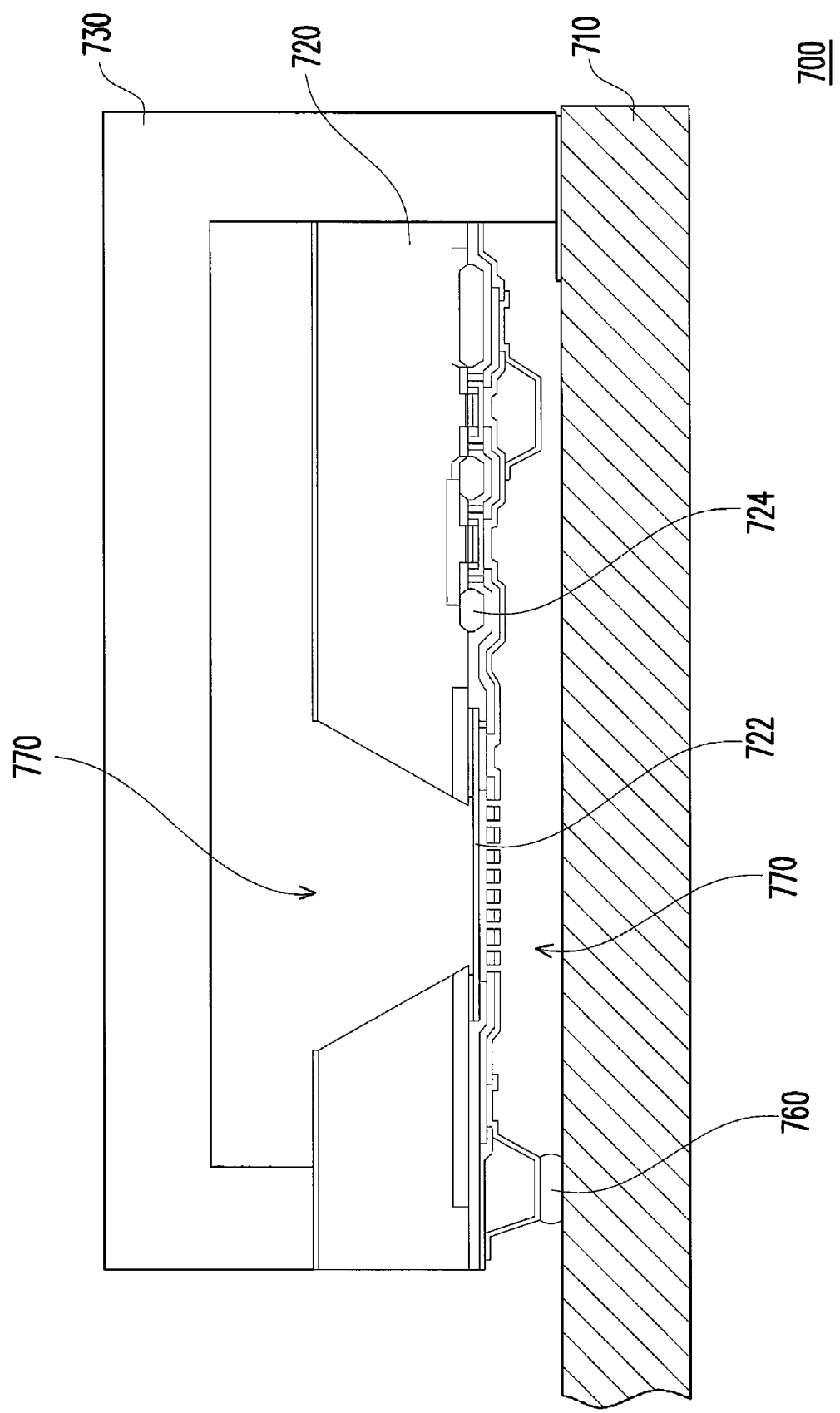
FIG. 7 is a cross-sectional view of a sensor according to an embodiment of the present disclosure.

In the present disclosure, in addition to dispose a channel in the carrier for transmitting sound waves to the sensor, in a sensor 700 of another embodiment (as shown in FIG. 7), a capacitive sensing element 720 is connected to a carrier 710 (for example, a PCB or a conductive plastic lamination layer) via a plurality of conductive bumps 760, so as to form a channel 780 among the capacitive sensing element 720, the plurality of conductive bumps 760, and the carrier 710. In detail, in the sensor 700, the capacitive sensing element 720 is, for example, bonded to the carrier 710 through a flip chip technique, so as to form a channel 780 among the capacitive sensing element 720, the conductive bumps 760, and the carrier 710. Furthermore, a cover 730 covers the capacitive sensing element 720, and a chamber 770 is formed between the cover 730 and the capacitive sensing element 720. The chamber 770 and the channel 780 are respectively located at two sides of a membrane 722 of the capacitive sensing element 720. As such, sound waves can be transmitted to the capacitive sensing element 720 via the channel 780. In this embodiment, the capacitive sensing element 720 is, for example, a CMOS device having a sensing circuit 724, for reading a vibration parameter of the membrane 722.

Figure 8:
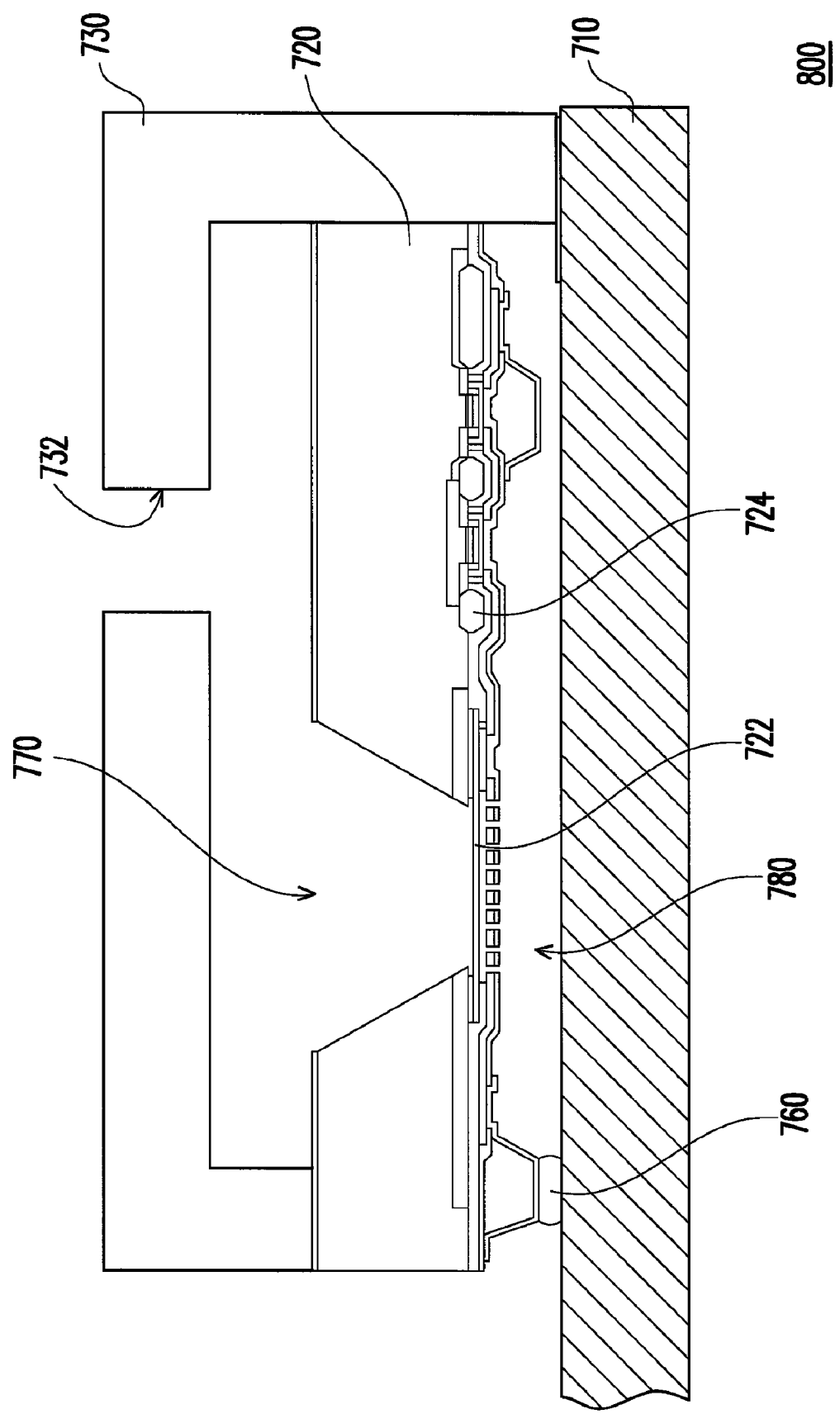
FIG. 8 is a cross-sectional view of a sensor according to an embodiment of the present disclosure.

Further, in the present disclosure, the cover 730 of the sensor 700 may also have a hole, such that the sensor 700 becomes a directional sensor 800 (as shown in FIG. 8). In detail, in this embodiment, a hole 732 in communication with the chamber 770 is formed in the cover 730. As such, sound waves can be transmitted to the membrane 722 via the channel 780 and the hole 732 respectively, and the readout circuit of the sensing circuit 724 reads the vibration parameter of the membrane 722, so as to identify the directions of the sound waves transmitted to the sensor 800 via the hole 732 and the channel 780.

In view of the above, in the sensor of the present disclosure, the capacitive sensing element is disposed on a carrier having two channels. External waves can be transmitted to the first chamber and the second chamber of the sensor via the two channels respectively. A time difference between the transmission of the sound waves is generated by setting different channel lengths or disposing a mechanical screen in one of the two channels, i.e., the sensor of the present disclosure is a directional sensor. In addition, the capacitive sensing element in the sensor converts the waves into an electrical signal. Further, the capacitive sensing element is connected to the carrier through a plurality of conductive bumps, so as to form a channel among the capacitive sensing element, the plurality of conductive bumps, and the carrier. External waves can also be transmitted to the first chamber and the second chamber of the sensor via the channel, and the capacitive sensing element converts the waves into the electrical signal.

Compared with the conventional art that an acoustic port is formed in the metal cover or an acoustic channel is formed in the cover, in the present disclosure, the metal cover dose not need to be processed, and the channel for transmitting waves is formed in the carrier in the course of fabricating the carrier, the sensor of the present disclosure has a good process yield. Besides, the channel formed in the carrier may not affect the overall height of the sensor, i.e., the sensor of the present disclosure has a small size, and is thus applicable to dispose in a light and thin electronic product. Further, the present disclosure can also form a hole in the cover to make the sensor function become a directional sensor.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A sensor, comprising:
   a carrier;
   a plurality of conductive bumps;
   a capacitive sensing element comprising a membrane, wherein the capacitive sensing element is connected to the carrier through the conductive bumps, and a channel is formed among the capacitive sensing element, the conductive bumps, and the carrier; and
   a cover bonded to a surface of the carrier for covering a top portion and a side surface of the capacitive sensing element, wherein a chamber is formed between the cover and the capacitive sensing element, the cover comprises a hole in communication with the chamber, and the chamber and the channel are respectively located at two sides of the membrane.

2. The sensor as claimed in claim 1, wherein the carrier is a PCB or a conductive plastic lamination layer.

3. The sensor as claimed in claim 1, wherein the capacitive sensing element is a CMOS device.

4. The sensor as claimed in claim 3, wherein the CMOS device further comprises a sensing circuit.

5. The sensor as claimed in claim 4, wherein the sensing circuit comprises a readout circuit, an amplifier circuit, and a pressurizing circuit.

6. The sensor as claimed in claim 1, wherein the capacitive sensing element is an electro-acoustic element or a pressure sensing element.

* * * * *